United States Patent
Voronin et al.

(10) Patent No.: US 9,346,005 B2
(45) Date of Patent: May 24, 2016

(54) APPARATUS FOR TREATING A GAS STREAM

(71) Applicant: Edwards Limited, Crawley, West Sussex (GB)

(72) Inventors: Sergey Alexandrovich Voronin, Rensselaer, NY (US); John Leslie Bidder, St. George (GB); Andrew Arthur Chambers, Clevedon (GB)

(73) Assignee: Edwards Limited, Crawley, West Sussex (GB)

( * ) Notice: Subject to any disclaimer, the term of this patent is extended or adjusted under 35 U.S.C. 154(b) by 0 days.

(21) Appl. No.: 14/358,935

(22) PCT Filed: Oct. 3, 2012

(86) PCT No.: PCT/GB2012/052443
§ 371 (c)(1),
(2) Date: May 16, 2014

(87) PCT Pub. No.: WO2013/072658
PCT Pub. Date: May 23, 2013

(65) Prior Publication Data
US 2014/0334982 A1  Nov. 13, 2014

(30) Foreign Application Priority Data
Nov. 19, 2011 (GB) .................................. 1119990.8

(51) Int. Cl.
*B01J 19/08* (2006.01)
*B01D 53/00* (2006.01)
*B01D 53/32* (2006.01)

(52) U.S. Cl.
CPC .............. *B01D 53/005* (2013.01); *B01D 53/32* (2013.01); *B01J 19/088* (2013.01); *B01D 2258/0216* (2013.01); *B01D 2259/818* (2013.01); *B01J 2219/0894* (2013.01)

(58) Field of Classification Search
CPC ................. B01D 53/32; B01D 53/005; B01D 2258/0216; B01D 2259/818; B01J 19/088; B01J 2219/0894; H05H 1/34; H05H 2001/3426; H05H 2001/3484; C01B 23/0042; C01B 23/0052; C01B 2210/0029; C01B 2210/0037
See application file for complete search history.

(56) References Cited

U.S. PATENT DOCUMENTS 5,779,991 A 7/1998 Jenkins
2002/0063530 A1 5/2002 Ikeda et al.
(Continued)

FOREIGN PATENT DOCUMENTS

| FR | 2873045 A1 | 1/2006 |
| JP | 2003183832 A | 7/2003 |
| WO | 2005079958 A1 | 9/2005 |
| WO | 2008068917 A1 | 6/2008 |

OTHER PUBLICATIONS

PCT International Search Report and Written Opinion dated Mar. 12, 2012 for corresponding Application No. PCT/GB2012/052443, filed Oct. 3, 2012.
(Continued)

*Primary Examiner* — Xiuyu Tai
(74) *Attorney, Agent, or Firm* — Westman, Champlin & Koehler, P.A.; Theodore M. Magee (57) ABSTRACT

An apparatus for treating a gas stream includes a plasma abatement device that has a reaction chamber and a plasma torch for generating a plasma stream for injection into the chamber for treating the gas stream. A first inlet conveys a gas stream into the plasma abatement device for treatment, and a second inlet, in a normal condition of the apparatus, is in flow communication with a source of reagent for conveying a reagent into the plasma device for improving the efficiency of the treatment. In a back-up condition of the apparatus, the second inlet is in flow communication with a gas stream source for conveying a gas stream into the device for treatment.

12 Claims, 10 Drawing Sheets

(56) References Cited

U.S. PATENT DOCUMENTS

2003/0209174 A1 11/2003 Chan
2007/0284242 A1 12/2007 Moisan et al.
2011/0135552 A1 6/2011 Dickinson et al.

OTHER PUBLICATIONS

British Search Report dated Mar. 12, 2012 for corresponding Application No. GB1119990.8.
Office Action dated May 26, 2015 for corresponding Chinese Application No. 201280056784.9.

APPARATUS FOR TREATING A GAS STREAM

CROSS-REFERENCE TO RELATED APPLICATION

This Application is a Section 371 National Stage Application of International Application No. PCT/GB2012/052443, filed Oct. 3, 2012, which is incorporated by reference in its entirety and published as WO 2013/072658 A1 on May 23, 2013 and which claims priority of British Application No. 1119990.8, filed Nov. 19, 2011.

BACKGROUND

The present invention relates to apparatus for treating a gas stream. The invention finds particular application in the treatment of a gas stream exhaust from a process chamber used in, for example, the semiconductor, solar or flat panel display industry.

One step in the fabrication of semiconductor devices is the formation of a thin film on a semiconductor substrate by chemical reaction of vapour precursors. One known technique for depositing a thin film on a substrate is chemical vapour deposition (CVD), which is commonly plasma enhanced. In this technique, process gases are supplied to a process chamber, housing the substrate, in which they react to form a thin film over the surface of the substrate. Examples of gases supplied to the process chamber to form a thin film include, but are not restricted to: Silane and ammonia for the formation of a silicon nitride film; Silane, ammonia and nitrous oxide for the formation of a SiON film; TEOS and one of oxygen and ozone for the formation of a silicon oxide film; and $Al(CH_3)_3$ and water vapour for the formation of an aluminium oxide film.

Gases exhausted from a process chamber can be treated with high efficiency and at a relatively low cost using a plasma abatement device. In the plasma abatement process, the gas stream to be treated is conveyed to a thermal atmospheric pressure plasma discharge (a plasma flare) which is primarily a source of heat. The plasma is preferably formed from an inert gas such as nitrogen and the process gasses passed to the flare subsequent to its formation as this protects the plasma forming device from damage. The plasma causes dissociation of the gas stream into reactive species, such as radicals, which can combine with oxygen or hydrogen species (also conveyed to the plasma flare) to produce relatively stable by-products.

A reaction chamber is located downstream of the plasma generator. The purpose of the reaction chamber is to provide a reaction space, remote from the plasma forming device, in which the gases exhausted from the process chamber can be treated by the plasma and react with additional reagent gases such as oxygen or hydrogen. The reaction chamber may consist of a pipe of dimensions which may for example be approximately 30 mm to 50 mm in diameter and 90 mm to 150 mm in length.

The noxious gases produced in the process chamber, namely unused precursor gases and the reaction by-products, must be treated as and when they are exhausted from the process chamber. They are not stored and then treated. Accordingly the plasma abatement device, sometimes referred to as a plasma burner, or torch, must be operational during processing. If for whatever reason the burner stops working or it needs to be taken off line for cleaning or repair the substrate processing also has to stop. This is clearly not desirable since the processing ideally runs continuously 24 hours and day, seven days a week. Accordingly it has been known to have a back up plasma burner device which can be brought in online should the main plasma burner break down or be taken off-line for any reason. However this is a very expensive solution to the problem since a very expensive plasma burner is kept largely inoperative a lot of the time.

The discussion above is merely provided for general background information and is not intended to be used as an aid in determining the scope of the claimed subject matter. The claimed subject matter is not limited to implementations that solve any or all disadvantages noted in the background.

SUMMARY

According to the present invention there is provided apparatus for treating a process gas stream, comprising a plasma abatement device having a reaction chamber, a plasma torch for generating a plasma stream for injection into the chamber for treating said process gas stream, a first inlet for conveying said process gas stream into the plasma abatement device for treatment; and a second inlet which, in a normal condition of the apparatus, is in flow communication with a source of reagent for conveying reagent into the plasma device for improving the efficiency of the treatment and which, in a back-up condition of the apparatus, is in flow communication with said process gas stream source for conveying a gas stream into the device for treatment.

The present invention also provides a system comprising an apparatus for treating a process gas stream, said apparatus further comprising at least one processing chamber, a primary gas duct for conveying a process gas stream from the process chamber to the first inlet of the plasma abatement device for treatment and a reagent gas duct connected between a source of reagent and the second inlet of the plasma abatement device for conveying reagent into the device for improving the efficiency of the treatment in the normal condition of the apparatus, a secondary gas duct connected between one of said at least one process chambers and the second inlet for conveying a process gas stream to the device for treatment in a back-up condition of the apparatus, and a control for selectively switching between the normal condition and back-up condition.

Other preferred and/or optional aspects of the invention are defined in the accompanying claims.

The Summary is provided to introduce a selection of concepts in a simplified form that are further described in the Detail Description. This Summary is not intended to identify key features or essential features of the claimed subject matter, nor is it intended to be used as an aid in determining the scope of the claimed subject matter.

BRIEF DESCRIPTION OF THE DRAWINGS

In order that the invention may be well understood, some embodiments thereof, which are given by way of example only, will now be described with reference to the accompanying drawings, in which.

DETAILED DESCRIPTION

Figure 1:
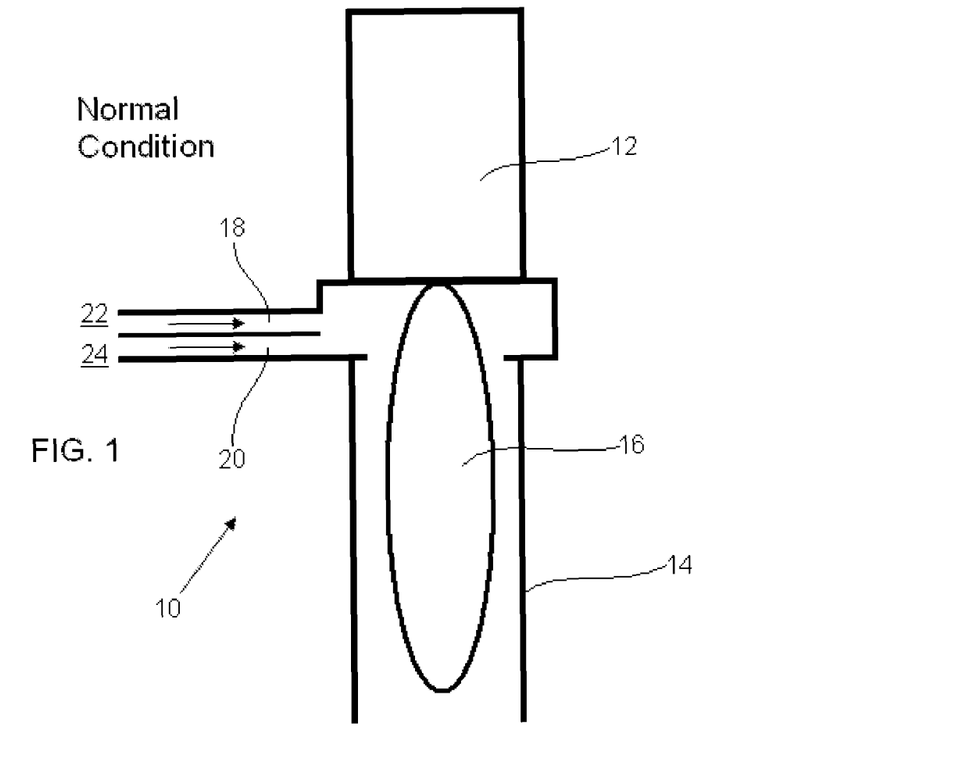
FIG. 1 is a schematic view of a plasma abatement device in a normal condition of a treatment apparatus.
Figure 2:
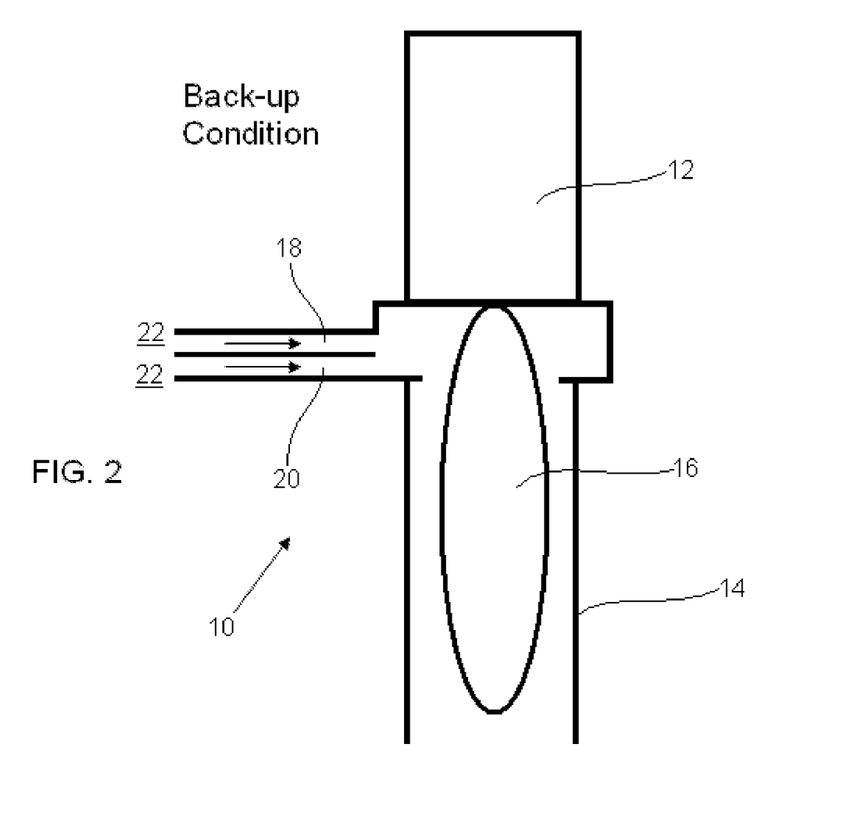
FIG. 2 is a schematic view of a plasma abatement device in a backup condition of the treatment apparatus.

FIGS. 1 and 2 are schematic views of a plasma abatement device 10 forming part of an apparatus for treating a gas stream. The device 10 comprises a plasma generator, or torch, 12 and a reaction chamber 14. The torch provides a plasma flare 16 for treating a gas stream conveyed to the device from a process chamber (see FIGS. 3, 4, 7 and 8). The plasma device is preferably a DC plasma device comprising a DC plasma torch, such as that described in EP1715937. The chamber 14 is provided with a first inlet 18 and a second inlet 20. In a normal condition of the apparatus shown in FIG. 1, the first inlet 18 is in fluid communication with a processing chamber. The stream of process gases 22 emitted from a processing chamber is caused to flow via inlet 18 into reaction chamber 14 and the plasma flare 16. The second inlet 20 is in fluid communication with a source of a reagent 24, typically oxygen, (see FIGS. 3, 4, 7 and 8). The reagent is caused to flow via inlet 20 into the chamber 14 where it is mixed with the process gases to improve the efficiency of treatment within the plasma flare 16. In a back-up condition of the apparatus shown in FIG. 2, a process gas 22 from a process chamber is conveyed to the second inlet 20 in place of the reagent 24. The back-up condition of the apparatus is selected if another plasma abatement device of the apparatus becomes inoperative or if a duct conveying process gas to another plasma device becomes occluded. Therefore in the back-up condition different process gases may be conveyed to the same reaction chamber. Alternatively or additionally, if the duct conveying process gas to the first inlet 18 becomes occluded, for instance by the build-up of solid deposits in the duct, the process gas 22 can be diverted to the second inlet 20 rather than the first inlet.

The present invention recognises that the supply of reagent to the reactor chamber can be dispensed with or at least can be supplied to the abatement process downstream of the reaction chamber. For example, it may be supplied into a spray tower (or wet scrubber) downstream of the reaction chamber to complete the treatment of the process exhaust gases. Accordingly, the gas stream is heated by the plasma 16 inside the reaction chamber 14, and then reacts with the reagent downstream of the reactor chamber. As the reaction takes place outside of the reactor and the gas temperature is colder the system efficiency is lower in this operating regime. Accordingly, in accordance with the present invention, the inlet normally used for the reagent gases can be used instead to inject process gases. This may be necessary if, for example, another abatement device such as a plasma burner goes offline. Generally a process tool, or system, will comprise a plurality of processing chambers and a respective plurality of plasma burners. Should one burner go offline, the process gas from the associated processing chamber is directed towards the reagent inlet of another plasma burner. That plasma burner therefore can treat process gases from more than one processing chamber but without the use of reagent in the reaction chamber.

One of the requirements of modern plasma abatement systems is to have an available back up inlet. The present invention provides a plasma abatement device with several separate gas inlets.

The present invention involves the understanding that whilst reagent is thought to be required for improving treatment of process gases in the reaction chamber, the requirement of reagent is subsidiary to the need for uninterrupted treatment of process gases. Accordingly, the flow of reagent into a device can be interrupted or injected downstream so that process gases can be diverted to the device through the inlet normally used for the reagent.

Figure 3:
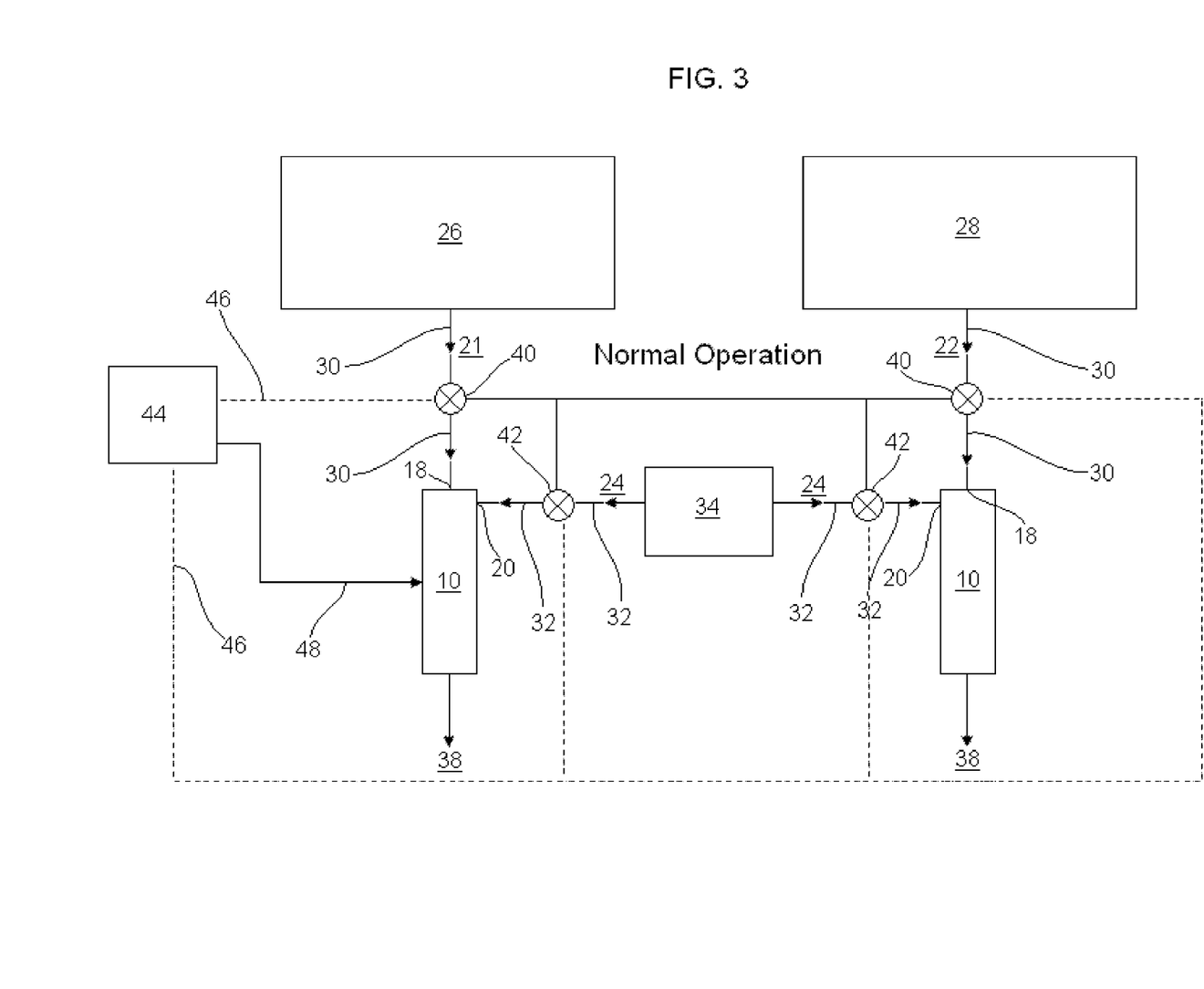
FIG. 3 is a schematic view of a processing system comprising the treatment apparatus in a normal condition.

A processing system is shown in FIG. 3 during a normal condition of an apparatus for treating a gas stream. Two process chambers 26, 28 are arranged for processing products such as semi-conductor wafers or flat panel displays. The processing is enabled by the use of various gases for etching, depositing or cleaning in a vacuum generating by one or more vacuum pumps (not shown, but located between the process chambers 26, 28 and abatement devices). These gases are noxious and cannot be released without treatment. A plurality of plasma abatement devices 10, as described in relation to FIGS. 1 and 2, are arranged to treat process gases released from the process chambers 26, 28.

Primary gas ducts 30 convey a process gas stream 21, 22 from the process chambers 28, 30, via vacuum pumps, to the first inlet 18 of the plasma abatement device 10 for treatment. Treated gas 38 is exhausted from the plasma abatement devices 10 for disposal or storage. Reagent gas ducts 32 are connected between one, or more, source(s) of reagent 34 and the second inlet 20 of the plasma abatement device for conveying reagent 24 into the device for improving the efficiency of the treatment in the normal operating condition of the apparatus.

Figure 4:
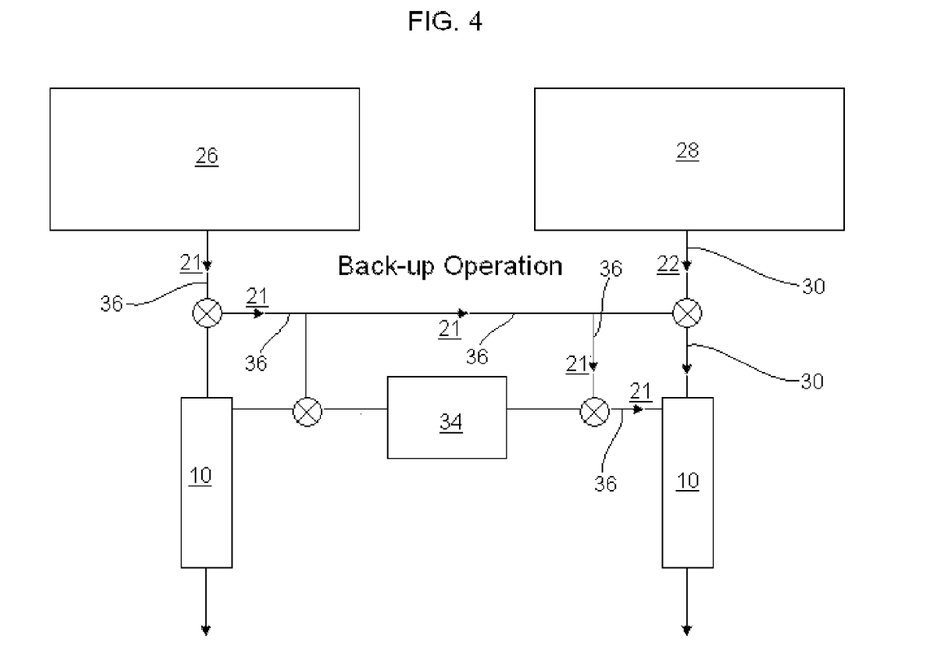
FIG. 4 is a schematic view of a processing system comprising the treatment apparatus in a back-up condition.

As shown in FIG. 4 when the apparatus is in the back-up condition, a secondary gas duct 36 is connected between the process chamber 26 and the second inlet 20 of the plasma abatement device 10 shown on the right for conveying a process gas stream 21 to the device for treatment. In this example, the plasma abatement apparatus 10 shown on the left in FIG. 4 has become inoperative or primary process gas duct has become partially or fully occluded. In this case, process gas 21 is diverted for treatment by the plasma abatement device 10 shown on the right in the Figure and therefore treatment of all of the gases exhausted from the process chambers is uninterrupted and the process tool 26 can remain operative. There is a relatively modest reduction in the efficiency of the gases without the reagent but this is considered preferable to interruption of treatment of exhaust gases from one of the process chambers 26 or interruption of the operation of said process chamber 26. The arrangement benefits in that a properly functioning plasma abatement device is not redundant in the apparatus and only when inoperative is gas diverted elsewhere in the apparatus for treatment.

Referring to both FIGS. 3 and 4, the treatment apparatus comprises a valve arrangement for allowing reagent to be conveyed through the reagent ducts 32 in the normal condition of the device. When treatment is interrupted in one of the abatement devices 10, the second gas stream is conveyed through the second process gas duct 36 in the back-up condition of the device.

The valve arrangement in the example shown in FIGS. 3 and 4 comprises first valves 40 located to convey process gas in the primary ducts 30 selectively towards either the first inlets 18 or the second inlets 20. Second valves 42 are located to convey selectively either reagent along the reagent ducts or process gas towards the second inlets 20. In this preferred arrangement, valves 40 and 42 are three way valves. The primary, reagent and secondary ducts share portions of the conduits, or pipes, which convey gas in the apparatus. That is, the primary and secondary ducts are co-extensive upstream of the first valves 40 and the secondary ducts and reagent ducts are co-extensive downstream of the second valves 42.

It will be apparent to those skilled in the art that the valves may be arranged differently from the arrangement shown in FIGS. 3 and 4 whilst still achieving the same desired result.

A control 44 is provided for selectively switching between the normal condition shown in FIG. 3 and back-up condition shown in FIG. 4. The control 44 is shown in FIG. 4 and is connected by control lines 46 (shown schematically in broken lines) to the valves 40, 42. The control selectively operates the valve arrangement for switching between the normal condition and the back-up condition. Switching may be initiated manually by an operative or may be automatic. In this latter case, a sensor 48 may be provided for sensing an operative condition of a plasma abatement device and outputting a signal to the control in the event that one or more of the plasma abatement devices are inoperative. For example, the sensor may monitor current of the DC plasma torch and, if the current falls below a predetermined current—indicative of a reduced gas flow, a system fail signal is outputted to the control 44 which can then activate a back-up condition. Similar sensors may be provided for the other plasma abatement devices of the system.

In the arrangement shown in FIGS. 3 and 4, there is a plurality of plasma abatement devices 10 having a respective plurality of first inlets 18 arranged to be in flow communication with a plurality of process chambers 26, 28. Whilst two such plasma abatement devices are shown connected to respective processing chambers, more than two may be provided as required. In the normal condition of the apparatus, the said second inlets 20 are arranged to be in flow communication with a source of reagent. In the back-up condition of the apparatus at least one second inlet is arranged to be in flow communication with one of said process chambers for receiving a gas stream from said process chamber for treatment. Therefore, in this arrangement, one plasma abatement device acts as a back-up for another plasma abatement device and is arranged in the back-up condition to receive a gas stream from a different one of said process chambers to the process chambers that it receives a gas stream from in the normal condition.

Figure 5:
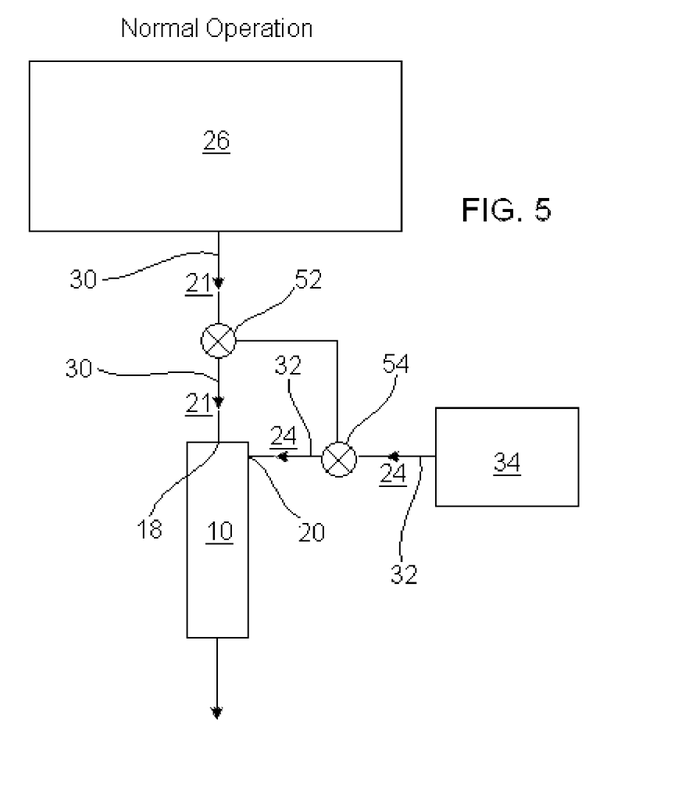
FIG. 5 is a schematic view of another plasma abatement device in a normal condition of a treatment apparatus.
Figure 6:
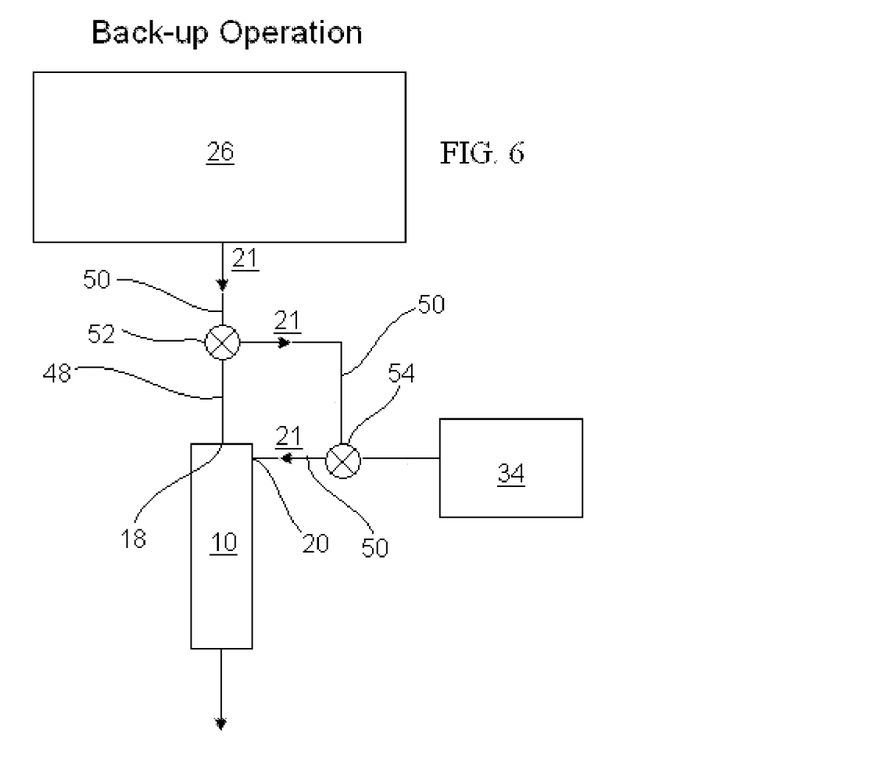
FIG. 6 is a schematic view of the other plasma abatement device in a backup condition of the treatment apparatus.

In an alternative arrangement shown in FIGS. 5 and 6, in the normal condition of the apparatus the first inlet 18 is arranged to be in flow communication with the process chamber 26 via a primary duct 30 to convey a gas stream 21 from the process chamber for treatment. The second inlet 20 is arranged to receive a reagent 24 from the source of reagent 34 along a reagent duct 32 for improving the efficiency of the treatment. This arrangement is similar to the arrangement shown in FIGS. 3 and 4. In the back-up condition, shown in FIG. 6, however the second inlet 20 is arranged to be in flow communication with the same process chamber 26 such that if flow is restricted to the first inlet along the primary duct 30 i.e. along a portion 48 of the primary duct, the gas stream 21 from said process chamber can be conveyed through the second inlet 20 via the secondary duct 50 for treatment.

Valves 52 and 54 are operable by a control (not shown) in a similar way to that shown in FIGS. 3 and 4.

Figure 7:
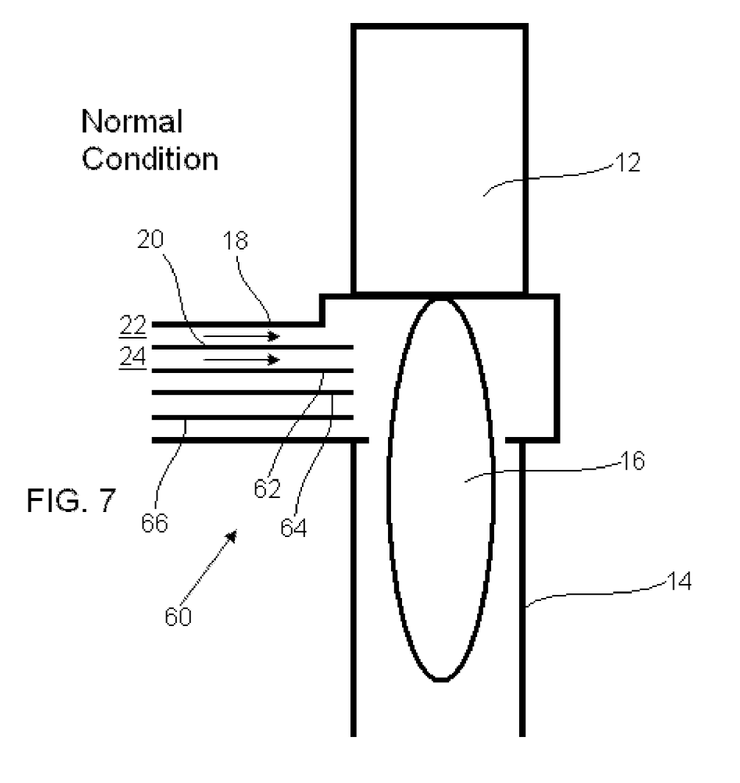
FIG. 7 is a schematic view of a processing system comprising another treatment apparatus in a normal condition.
Figure 8:
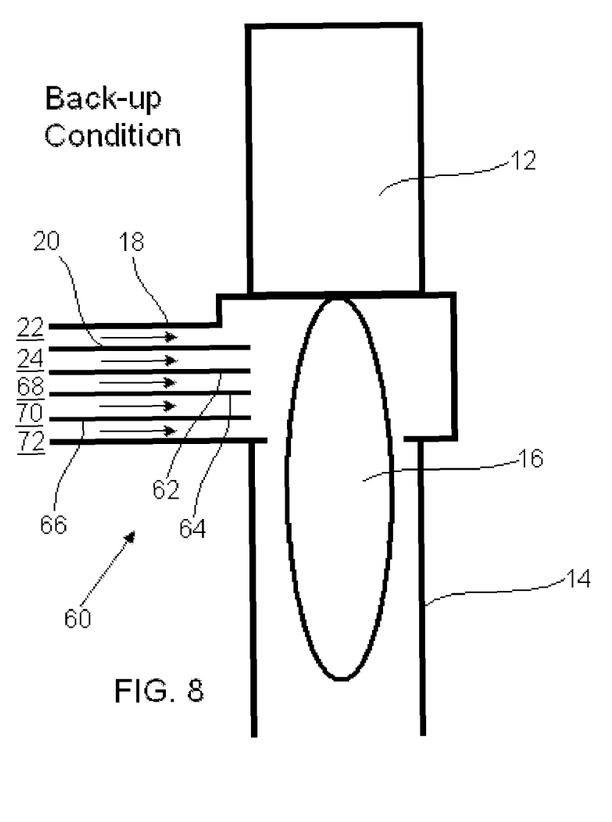
FIG. 8 is a schematic view of a processing system comprising the treatment apparatus in a back-up condition.

In a modification of the arrangements previously described in FIGS. 3 and 4 or FIGS. 5 and 6, at least one of the plasma abatement devices comprises at least three inlets and one of said inlets only conveys a gas stream or reagent into the plasma abatement device in the back-up condition of the apparatus. A plasma abatement device 60 arranged in this way is shown in FIGS. 7 and 8 and comprises three additional inlets 62, 64, 66. In the normal condition of the apparatus in which there are multiple similar plasma abatement devices 60, the first inlet 18 receives a gas stream from a first chamber, the second inlet receives a reagent from the source of reagent 34 and the further inlets 62, 64, 66 are not used. In a back-up condition, the further inlets may receive a second gas stream 68, a third gas stream 70 or a fourth gas stream 72 from respective process chambers. In this way, three further gas streams can be treated if their respective plasma abatement devices become inoperative, whilst still maintaining a flow of reagent into the device to improve the efficiency of treatment. Optionally the second inlet 20 could also be used to treat a gas stream from a further process chamber; although in this case reagent would not be supplied to the device 60.

In a preferred arrangement, at least one, and more preferably all, of the plasma abatement devices comprises the same number of inlets as there are process chambers, such that in the back-up condition of the apparatus, the gas streams from all of the process chambers can be conveyed to the device through respective said inlets for treatment in said device.

Figure 9:
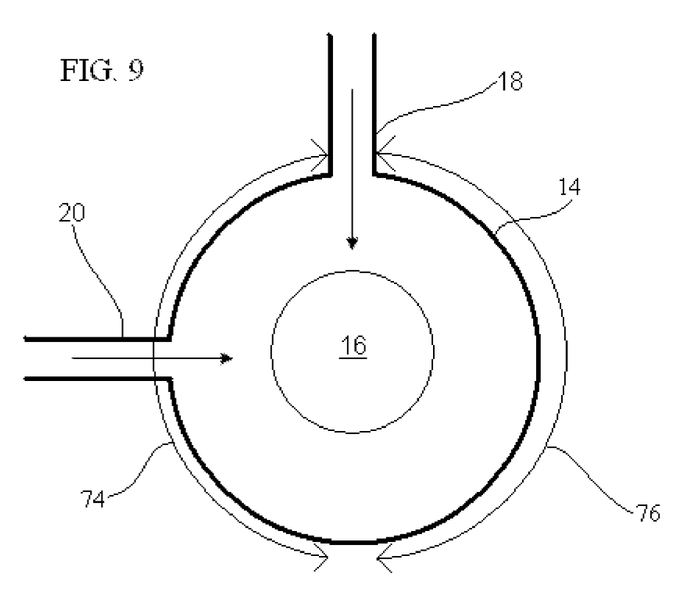
FIG. 9 shows a part view of a plasma abatement device.

The first inlet and the second inlet of a said plasma abatement device are configured to direct fluid into reaction chamber 14 so that fluid conveyed through the first inlet or the second inlet is directed away from the second inlet or the first inlet respectively to reduce mixing of the fluids in either of the inlets. FIG. 9 shows a view of the reactor chamber 14, a plasma flare 16 and first and second inlets 18, 20. The first inlet 18 introduces gas flow in a direction which is generally perpendicular from the direction of gas flow introduced to the reactor through second inlet 20. It will be seen therefore that gas from one inlet is directed away from the other inlet so that reaction of the two gases does not generally take place in either of the inlets. Instead, reaction between the two gases occurs in the plasma flare 16 resulting in more efficient treatment of the gas stream or streams.

Also shown in FIG. 9 are two double-headed arrows 74, 76. Arrow 74 shows the range of positions in which the first inlet is preferably located whilst still achieving the same effect, namely that gases passing through the two inlets are directed away the other inlets. On the other hand, the arrow 76 shows the range of undesirable positions in which the first inlet 18 may be located which would result in gas from one inlet being directed towards the other inlet.

The preferred arrangement directing gas from one inlet away from another inlet, particularly where there are a multiplicity of inlets are shown in FIGS. 1 and 7 in which the inlets are configured to convey fluid into the device in directions which are generally parallel one direction with another direction. As will be seen from these Figures, the inlets are arranged with one inlet vertically above an adjacent inlet and with each inlet mechanically separated from the other inlets to space the inlets apart.

The configuration of the inlets into the reaction chamber 14 is more important if both inlets are to be used to inject process gases. It is important that the different process gases do not react with each other prior to being injected into the plasma flare. As both inlets may be used to inject process gas in the back-up operational condition the inlets therefore should not be located opposite each other as shown by the range of positions 76 in FIG. 9. It is possible to have the inlets located such that the gases are injected at an angle to each other. However better results are available when the inlets are configured with the flow of gases all being directed in the same direction into the reactor chamber.

FIG. 3 is a schematic view of a plasma abatement device in accordance with the present invention.

Figure 10:
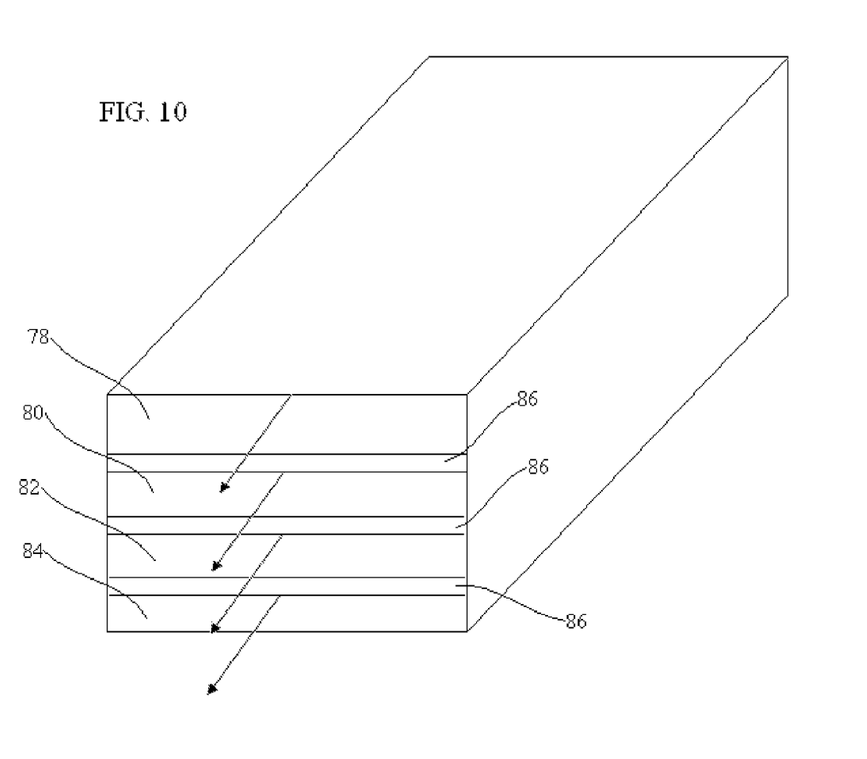
FIG. 10 shows an inlet arrangement for a plasma abatement device.

A multiple inlet arrangement is shown in FIG. 10 which can be adopted in any of the previously discussed embodiments. The inlet arrangement has a "slice-type" structure having four inlets 78, 80, 82, 84 separated from each other mechanically by spacers 86. The "slice-type" structure allows introduction of different process gases into one plasma reactor chamber without their mixing at the inlets.

The treatment apparatus as described with reference to the Figures constitutes an improvement as part of a processing system comprising at least one processing chamber. The apparatus comprises a primary gas duct, i.e. conduit, for conveying a process gas stream from the process chamber to the first inlet of the plasma abatement device for treatment and a reagent gas duct connected between a source of reagent and the second inlet of the plasma abatement device for conveying reagent into the device for improving the efficiency of the treatment in the normal condition of the apparatus. A secondary gas duct connected between one of said at least one process chambers and the second inlet conveys a process gas stream to the device for treatment in a back-up condition of the apparatus. A control means selectively switches between the normal condition and back-up condition.

Typically, the system comprises a plurality of process chambers, wherein in the normal condition of the apparatus a plurality of process gas streams are conveyed from the process chambers to the first inlets of respective plasma abatement devices, and in the back-up condition the gas stream a process gases is conveyed to the second inlet of one of said plasma abatement devices.

If there is only one process chamber, in the normal condition of the apparatus a process gas stream is conveyed from the process chamber to the first inlet of a single plasma abatement device, and in the back-up condition the gas stream is diverted to the second inlet of device for treatment in place of the reagent.

The invention has been described above with respect to a preferred embodiment. It will be understood by those skilled in the art that changes and modifications may be made thereto without departing from the scope of the invention as set out in the appended claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
a plasma abatement device having a reaction chamber, a plasma torch, a first inlet and a second inlet;
a valve arrangement connected to the second inlet, a source of reagent, and a process device, wherein the valve arrangement is selectively controllable between a first condition, in which the valve arrangement provides a flow path from the source of reagent through the second inlet into the plasma abatement device, and a second condition, in which the valve arrangement provides a flow path from the process device through the second inlet into the plasm abatement device.

2. The apparatus according to claim 1, wherein the first inlet is in flow communication with a first process chamber that produces a first process exhaust gas stream and the process device comprises a second process chamber that produces a second process exhaust gas stream.

3. The apparatus according to claim 1, wherein the valve arrangement comprises first and second valves, the first valve on a reagent conduit between the second inlet and the source of reagent; the second valve on a primary conduit between the first valve and the process device, and a secondary conduit extending from the first valve to the second valve.

4. The apparatus according to claim 2, further comprising:
a second plasma abatement device having a reaction chamber, a plasma torch, a first inlet and a second inlet; and
wherein the valve arrangement is further connected to the second inlet of the second plasma abatement device, and the first process chamber, such that in the first condition, the valve arrangement provides a flow path from the source of reagent to the second inlet of the second plasma abatement device and the valve arrangement is selectively controllable to be in a third condition, in which the valve arrangement provides a flow path from the first process chamber to the second inlet of the second plasma abatement device.

5. The apparatus according to claim 1, wherein the first inlet and the second inlet of the plasma abatement device are configured to convey fluid into plasma abatement device in respective directions so that fluid conveyed through the first inlet is directed away from the second inlet to reduce mixing of the fluids in either of the inlets.

6. The apparatus according to claim 5, wherein the first inlet and the second inlet of the plasma abatement device are configured to convey fluid into the device in directions which are generally parallel one direction with another direction.

7. The apparatus according to claim 6, wherein the first and second inlets are arranged with one of the first and second inlets vertically above and adjacent the other of the first and second inlets.

8. The apparatus according to claim 6, wherein each of the first and second inlets is physically separated from the other of the first and second inlets.

9. The apparatus according to claim 1, wherein a control is manually operable to switch the valve arrangement from the first condition to the second condition.

10. The apparatus according to claim 4, comprising a sensor for sensing a reduction in treatment of a gas stream by the plasma abatement device and outputting a signal to a control which in response places the valve arrangement in the third condition.

11. A system comprising a plasma abatement device having a reaction chamber, a plasma torch, a first inlet; and a second inlet,
the system further comprising a process chamber, and a valve arrangement, the valve arrangement such that a duct from the process chamber to the first inlet of the plasma abatement device is closed by the valve arrangement, a duct from a source of reagent to the second inlet of the plasma abatement device is closed by the valve arrangement, and a duct from the process chamber to the second inlet is open through the valve arrangement.

12. The system according to claim 11, further comprising a plurality of process chambers and a plurality of plasma abatement devices, wherein ducts from all but one of the process chambers to respective first inlets of the plasma abatement devices are open through the valve arrangement and a duct from the one process chamber to a second inlet of one of the plurality of plasma abatement devices is open through the valve arrangement.

* * * * *